(12) United States Patent
Mikulenka et al.

(10) Patent No.: US 7,515,442 B2
(45) Date of Patent: Apr. 7, 2009

(54) SECONDARY SIDE CONTROLLER AND METHOD THEREFOR

(75) Inventors: Frantisek Mikulenka, Roznov Pod Radhostem (CZ); Roman Urban, Trnava (SK)

(73) Assignee: Semiconductor Components Industries, L.L.C., Phoenix, AZ (US)

(*) Notice: Subject to any disclaimer, the term of this patent is extended or adjusted under 35 U.S.C. 154(b) by 315 days.

(21) Appl. No.: 11/137,872

(22) Filed: May 27, 2005

(65) Prior Publication Data

US 2006/0268586 A1 Nov. 30, 2006

(51) Int. Cl.
*H02M 3/335* (2006.01)
*H02H 7/122* (2006.01)

(52) U.S. Cl. .............. 363/21.12; 363/97; 363/56.11; 363/21.18; 363/21.16; 363/21.14

(58) Field of Classification Search .......... 363/21.12, 363/21.14, 21.16, 21.17, 21.18, 56.11, 97
See application file for complete search history.

(56) References Cited

U.S. PATENT DOCUMENTS

| 6,459,595 | B2 * | 10/2002 | Assow ................... 363/21.14 |
| 6,671,189 | B2 * | 12/2003 | Jansen et al. ............. 363/21.14 |
| 6,757,182 | B2 * | 6/2004 | Smidt et al. .............. 363/21.14 |
| 6,788,555 | B2 * | 9/2004 | Bourdillon et al. ........ 363/21.14 |
| 6,809,939 | B1 * | 10/2004 | Yang ..................... 363/21.14 |
| 6,856,149 | B2 * | 2/2005 | Yang ..................... 324/726 |
| 6,961,256 | B2 * | 11/2005 | Yang ..................... 363/127 |
| 6,995,991 | B1 * | 2/2006 | Yang et al. ............... 363/21.14 |

OTHER PUBLICATIONS

"LT3710 Secondary Side Synchronous Post Regulator", Linear Technology Data Sheet, pp. 1-12, Copyright 2002.
"Secondary Side Synchronous Post Regulator, UC1584, UC2584, UC3584", Unitrode, Data Sheet, pp. 1-7, Mar. 1999, Copyright 1999 Texas Instruments Incorporated.

* cited by examiner

*Primary Examiner*—Bao Q Vu
(74) *Attorney, Agent, or Firm*—Robert F. Hightower

(57) ABSTRACT

In one embodiment, a secondary side power supply controller is configured to enable a secondary side power switch independently of a state of a drive signal used to control a primary side of the power supply.

20 Claims, 3 Drawing Sheets

SECONDARY SIDE CONTROLLER AND METHOD THEREFOR

BACKGROUND OF THE INVENTION

The present invention relates, in general, to electronics, and more particularly, to methods of forming semiconductor devices and structure.

In the past, the semiconductor industry utilized various methods and structures to form secondary side power supply controllers. These secondary side power supply controllers typically were used to control power transistors connected to the secondary windings of a power supply system in order to control the output voltage on that particular secondary winding. Examples of such secondary side power supply controllers include the LT3710 offered by Linear Technology Corp. of Milpitas Calif. and the UT1584 offered by Texas Instruments Corp. of Dallas Tex. and formally offered by Unitrode Corp. of Merrimack N.H. One problem with these prior secondary side power supply controllers was propagation delay between detecting enablement of the primary power transistor and enabling the secondary side power transistor. This propagation delay limited the usable operating frequency of the secondary side power supply controller and resulted in poor regulation. Additionally, these prior secondary side power supply controllers generally regulated the secondary side output voltage with a limited duty cycle that could not achieve a full range of duty cycles. The limited duty cycle generally could not achieve a duty cycle that approached either zero or one hundred per cent which often resulted in poor regulation.

Accordingly, it is desirable to have a secondary side power supply controller and method that minimizes delay between the primary and secondary transistors, that facilitates an increased duty cycle operating range, and that can facilitates achieving a near zero per cent and near one hundred per cent duty cycle.

For simplicity and clarity of illustration, elements in the figures are not necessarily to scale, and the same reference numbers in different figures denote the same elements. Additionally, descriptions and details of well-known steps and elements are omitted for simplicity of the description. As used herein current carrying electrode means an element of a device that carries current through the device such as a source or a drain of an MOS transistor or an emitter or a collector of a bipolar transistor or a cathode or anode of a diode, and a control electrode means an element of the device that controls current through the device such as a gate of an MOS transistor or a base of a bipolar transistor. Although the devices are explained herein as certain N-channel or P-Channel devices, a person of ordinary skill in the art will appreciate that complementary devices are also possible in accordance with the present invention.

DETAILED DESCRIPTION OF THE DRAWINGS

Figure 1:
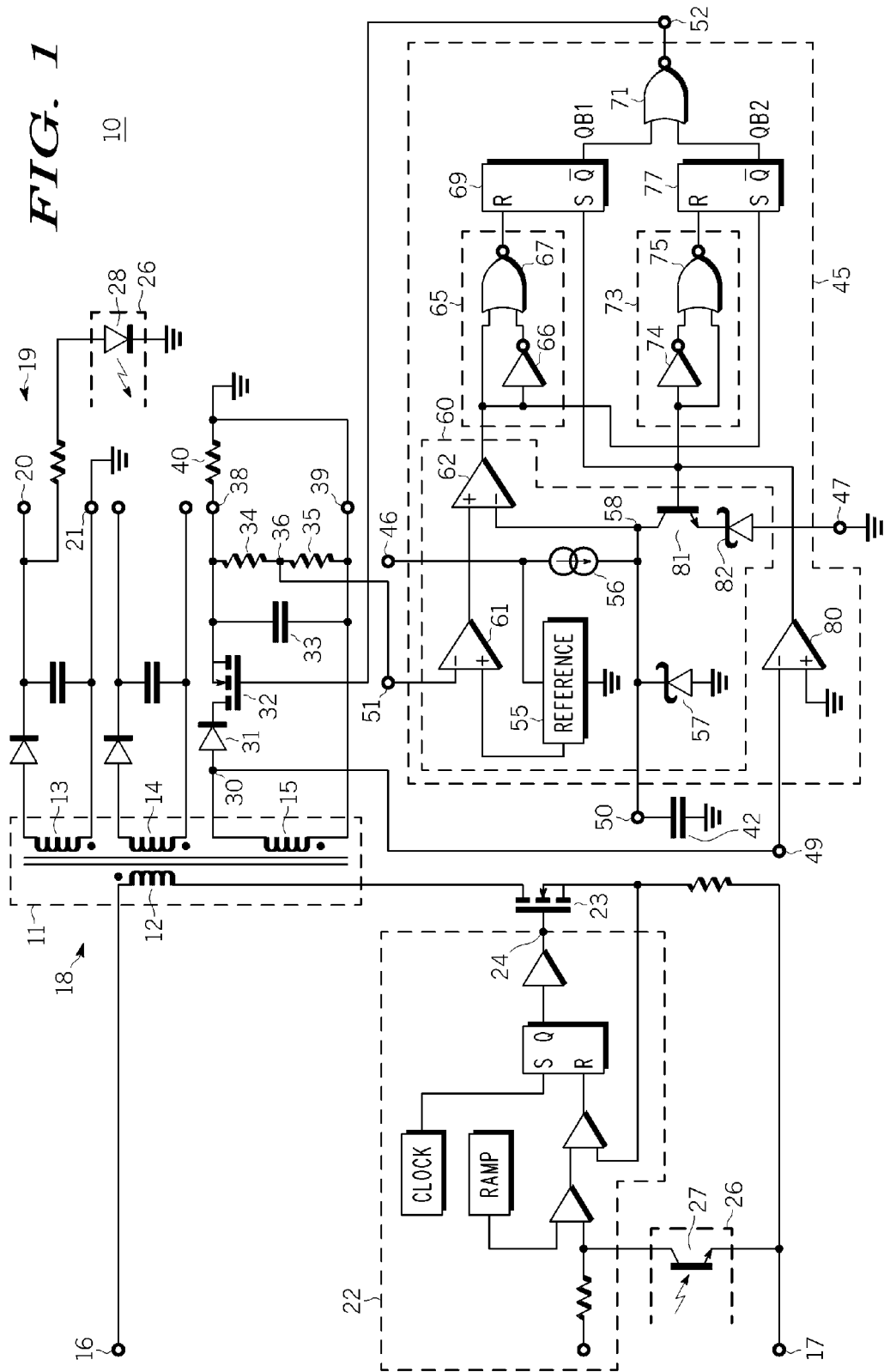
FIG. 1 schematically illustrates a portion of an embodiment of a power supply system that includes a secondary side power supply controller in accordance with the present invention.

FIG. 1 schematically illustrates an embodiment of a portion of a power supply system 10. System 10 includes a transformer 11 that partitions system 10 into a primary side 18 and a secondary side 19. Secondary side 19 includes a secondary side power supply controller 45 that is utilized to regulate the value of a secondary side output voltage on a secondary winding 15 of transformer 11. Transformer 11 includes a primary winding 12 and secondary windings 13, 14, and 15. Although three secondary windings are illustrated, those skilled in the art will appreciate that transformer 11 may have fewer than three or more than three secondary windings. Primary side 18 typically receives power between a power input terminal 16 and a power return terminal 17 that are coupled to primary winding 12. Primary side 18 includes a switching power supply controller 22 that is utilized to control a power transistor 23 in order to regulate the value of the voltage of main secondary winding 13. Although controller 22 is illustrated as a fixed frequency current mode controller, other configurations such as a quasi-resonant controller, may also be used. Controller 22 receives a primary side feedback voltage or primary feedback that is representative of the value of the voltage of main secondary winding 13 and forms a primary side switching drive signal or primary drive signal 24 that controls transistor 23. Typically, the primary side feedback voltage is formed by an optical coupler 26 that has an optical emitter 28 coupled to a main output 20 of winding 13 and an optical transistor 27 that provides the primary side feedback voltage to controller 22. Secondary winding 13 generally functions as a main output and typically forms a voltage between main output 20 and a main return 21 that is greater than the secondary side output voltage of winding 15. Secondary winding 14 is an auxiliary winding that is not used in the embodiment of FIG. 1. Winding 15 is used to supply the secondary side output voltage that is regulated to a value determined by controller 45 and not by controller 22. For example, the secondary side output voltage may be used to power a microprocessor or other control logic while the voltage from main secondary winding 13 may be used for a visual display device, such as a CRT, or other higher voltage device.

Secondary side 19 includes a secondary side power switch such as a power transistor 32 that is coupled to one terminal of winding 15 and is switched by controller 45 in order to regulate the value of the secondary side output voltage or secondary voltage formed between a secondary output 38 and a secondary return 39. A feedback network is connected between output 38 and return 39 in order to form a secondary side feedback voltage or feedback voltage that is representative of the value of the secondary voltage. In the preferred embodiment, the feedback network includes a resistor divider formed by a resistor 34 that is connected in series with a resistor 35 and coupled between output 38 and return 39. A feedback node 36 at a common connection between resistors 34 and 35 provides the feedback voltage. A filter capacitor 33 is used to filter the secondary voltage, a blocking diode 31 blocks negative excursions of node 30 from transistor 32, and a resistor 40 is used to illustrate a load that may be powered by winding 15. However, the load is not limited to pure resistive loads.

The operation of controller 45 typically is synchronized with the operation of controller 22. Controller 45 includes a synchronizing circuit that is configured to receive an input signal from winding 15 that is can be used to determine the state of switching drive signal 24. The synchronizing circuit includes a synchronizing comparator 80 that generates a synchronizing (sync) signal that is representative of switching drive signal 24. Controller 45 also includes a switching control section 60, and control logic that includes an edge detector 65, a latch 69, an edge detector 73, a latch 77, and a NOR gate 71. Note that latches 69 and 77 are set dominant latches. Switching control section 60 includes a reference generator or reference 55, a current source 56, a zener diode 57, a zener diode 82, a switch or transistor 81, an error amplifier 61, and a pulse width modulated (PWM) comparator 62. Edge detector 65 includes an inverter 66 and a NOR gate 67, and detector 73 includes an inverter 74 and a NOR gate 75. Edge detectors 65 and 73 are configured to detect a negative going edge of a signal and responsively provide a pulse having a predetermined pulse width. Such edge detectors are well known to those skilled in the art. Additionally, those skilled in the art will appreciate that edge detectors 65 and 73 may use other logic to implement the edge detection function. Controller 45 generally receives power between a power input 46 and a power return 47. Typically, input 46 is connected to output 20 to receive power and return 47 is connected to return 39 and main return 21. Controller 45 also includes a sync input 49, a ramp terminal 50, a feedback input 51, and a switching drive signal output 52.

Controller 45 is formed to control the state of the switching drive signal formed on output 52 in order to control transistor 32 to regulate the value of the secondary voltage formed between output 38 and return 39. During the time that the value of the secondary voltage is no greater than a first voltage value, controller 45 enables transistor 32 with a substantially 100% duty cycle independently of the state of primary drive signal 24. During the time that the value of the secondary voltage is no less than a second value, controller 45 controls the state of the switching drive signal to disable transistor 32 with a substantially zero per cent (0%) duty cycle independently of the state of primary drive signal 24. Configuring controller 45 to generate a duty cycle that can range from substantially zero to substantially one hundred per cent (0%-100%) assists in improving the regulation accuracy of the secondary voltage. While the secondary is between the first value and the second value, controller 45 forms the switching drive signal to control transistor 32 to regulate the secondary voltage substantially synchronously with the state of primary drive signal 24. It will be appreciated by those skilled in the art that the words during, while, and when are not exact terms that mean an action takes place instantly upon an initiating action but that there may be some small but reasonable delay between the reaction that is initiated by the initial action. The delay may be due to delays through the control elements of controller 45 or due to parasitic delays such as parasitic capacitance.

Sync comparator 80 forms a sync signal on the output of comparator 80 that is representative of primary drive signal 24. When signal 24 enables transistor 23, current flows through winding 12 and creates a corresponding negative going voltage on a terminal 30 of winding 15. Diode 31 blocks negative excursions of the voltage on node 30. Thus, the waveform of the voltage on terminal 30 is approximately a half-wave rectified waveform that has a positive excursion and goes negative by an amount approximately equal to the forward voltage of diode 31. Sync comparator 80 receives the voltage from terminal 30. Comparator 80 compares the voltage on terminal 30 to the voltage on return 47 which in the preferred embodiment is a value of the voltage on return 39. As the voltage on node 30 reaches zero or goes negative, the output of comparator 80 goes high. Thus, comparator 80 generates the sync signal that is substantially the same as signal 24 but may be slightly delayed in time due to propagation delays, such as through transformer 11 and comparator 80.

Transistor 81, diodes 57 and 82, and current source 56 assist in forming a ramp signal or ramp that is utilized for forming a switching control signal on the output of PWM comparator 62. When the sync signal on the output of comparator 80 goes low, transistor 81 is disabled and current source 56 begins charging an external capacitor 42 through terminal 50 at a rate determined by the current supplied by source 56 and the value of capacitor 42. Zener diode 57 limits the maximum value of the voltage which can be stored on capacitor 42. Zener diode 57 clamps a node 58 to the zener voltage of diode 57 when capacitor 42 charges to a voltage that is equal to the zener voltage. As will be seen further hereinafter, the value of this clamp voltage establishes a first feedback voltage value that is representative of the first voltage value referred to in the previous paragraph. When the sync signal on the output of comparator 80 goes high, transistor 81 is enabled and discharges capacitor 42 to reset the ramp signal. The ramp signal remains reset until transistor 81 is once again disabled by the sync signal. The value of the zener voltage of zener diode 82 limits the minimum voltage to which capacitor 42 can be discharged. As will be seen further hereinafter, the value of the zener voltage of diode 82 establishes a second feedback voltage value that is representative of the second voltage value referred to in the previous paragraph. The value of the zener voltage of diodes 57 and 82 generally are chosen to be substantially equal to the feedback voltage values that represent the desired maximum and minimum voltages, respectively, of the secondary voltage on output 38.

Those skilled in the are will appreciate that controller 45 may include other functional blocks such as Soft-Start and Under Voltage Lock-Out (UVLO) that are not shown in FIG. 1 for simplicity of the drawings.

Figure 2:
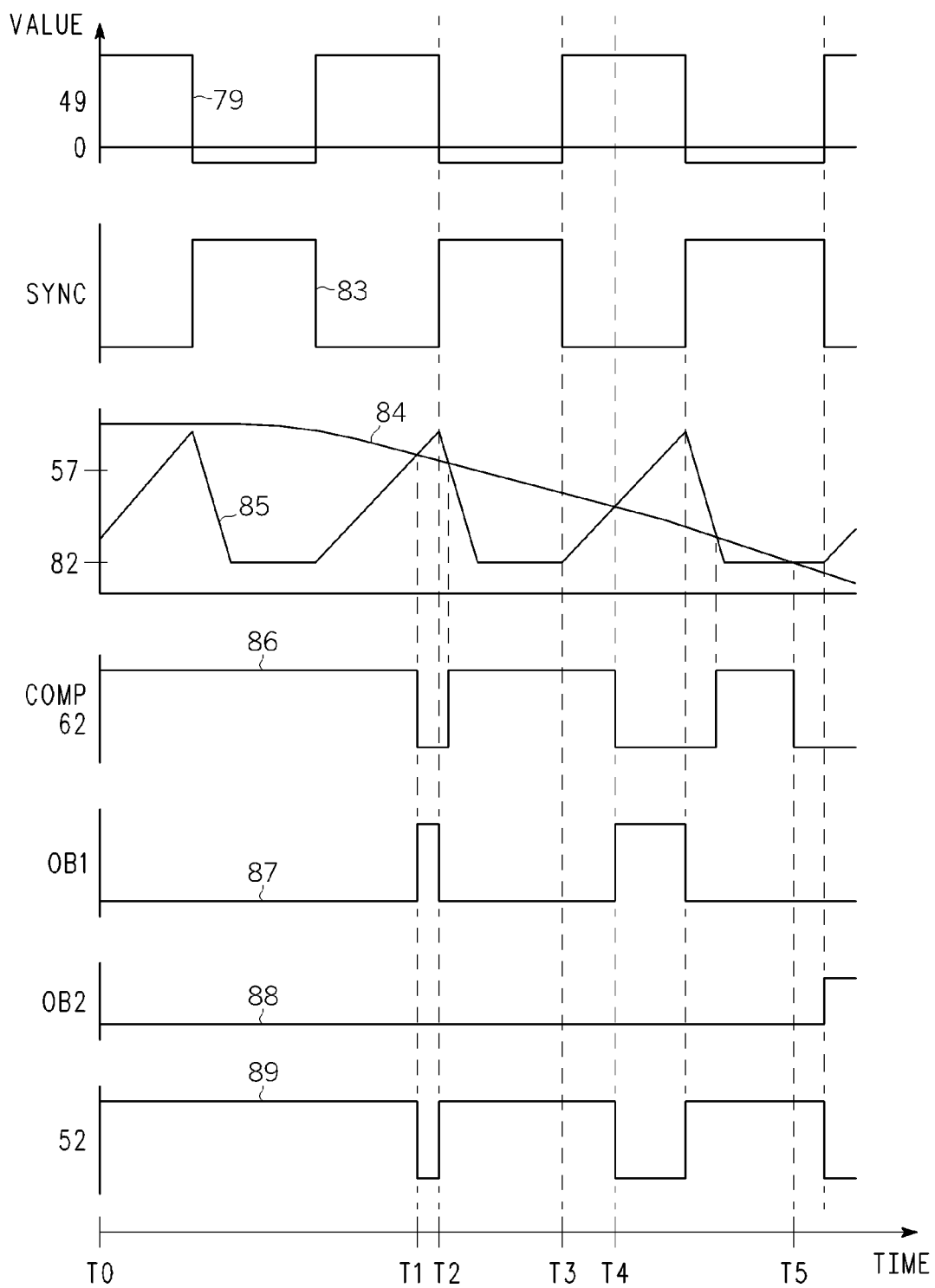
FIG. 2 is a graph having plots that illustrate some of the timing signals of the power supply system of FIG. 1 in accordance with the present invention.

FIG. 2 is a graph having plots that illustrate some of the signals of controller 45. The abscissa indicates increasing time and the ordinate indicates increasing value of the signals of each plot. This description has references to both FIG. 1 and FIG. 2. A plot 79 illustrates the input signal on sync input 49. A plot 83 illustrates the sync signal output of comparator 80. A plot 84 illustrates the error signal output of amplifier 61. A plot 85 illustrates the ramp signal on node 58. Plots 86, 87, 88, and 89 respectively illustrate the output of comparator 62, QB1, QB2, and output 52.

In operation assume that initially and prior to a time T0, the secondary voltage between output 38 and return 39 is sufficiently low so that the value of the feedback voltage received on input 51 is less than the reference voltage (Vref) on the output of reference 55. The resulting error signal on the output of amplifier 61 is high, typically at its maximum value. Since the value of the error signal is greater than the value of the zener voltage of diode 57, the output of PWM comparator 62 is high. Comparator 80 has received voltage transitions from terminal 30 and is forming the sync signal and forming the ramp signal on node 58 synchronously with primary drive signal 24. A previous positive output value of the sync signal from comparator 80 has set latch 69 so the Q bar output (QB1) is low. Previous negative transitions of comparator 80 have no effect on latch 77 since the high from comparator 62 holds the set input high to force the Q bar output (QB2) low. Because both inputs to gate 71 are low, the switching drive signal on output 52 is high and enables transistor 32. As comparator 80 receives transitions from terminal 30 and the output of comparator 80 transitions between high and low, section 60 generates the Ramp signal. The high outputs of comparator 80 forces the set input of latch 69 high keeping the same state on QB1 since latch 69 was already set. The negative transitions of comparator 80 have no effect on latch 77 which is held set by the high from comparator 62. Thus, at time T0 output 38 is low, QB1 and QB2 remain low, and output 52 remains high to keep transistor 32 enabled and the control logic overrides the sync signal at least after the secondary voltage is less than the first value. As primary switching drive signal 24 enables and disables transistor 23 causing the voltage on terminal 30 to vary and correspondingly enabling and disabling the sync signal on the output of comparator 80, transistor 32 remains enabled at substantially a 100% duty cycle. The high duty rate allows the secondary voltage to form more rapidly and reduces the start-up time for system 10. Consequently, controller 45 enables transistor 32 at a substantially 100% duty cycle regardless of the state of primary drive signal 24 or transistor 23.

Controller 45 continues to assert the secondary switching drive signal to enable transistor 32 until the value of the secondary voltage increases to or above the first value. Assume that at a time T1, the value of the secondary voltage increases to the first value, the feedback voltage increases causing the error signal from amplifier 61 to responsively decrease to a value no greater than the value set by the zener voltage of diode 57 as illustrated by plot 84. Note that even though controller 45 was maintaining transistor 32 in the enabled state, the ramp signal continued to be generated by comparator 80 and section 60. As the value of the secondary voltage increases to and above the first value, the output of error amplifier 61 decreases and reaches the value of the ramp signal causing the output of comparator 62 to transition from a high to a low value. The high to low transition of comparator 62 removes the high from the set input of latch 77 which has no effect on latch 77 and also creates a positive going pulse on the output of edge detector 65 which resets latch 69 forcing QB1 high. The high from QB1 forces the secondary switching drive signal on output 52 low to disable transistor 32. Thus, the secondary voltage has reached a desired value represented by the feedback signal and transistor 32 is disabled. As long as the secondary voltage remains between the first and second values, controller 45 and the secondary feedback loop will regulate the secondary voltage substantially synchronously with controller 22.

At a time T2, primary drive signal 24 enables transistor 23 and the falling voltage on terminal 30 forces the output of comparator 80 high. The high output of comparator 80 is fed forward around transistor 81 to rapidly set latch 69 and force QB1 low. The high from comparator 80 also enables transistor 81 to discharge capacitor 42 and reset the ramp signal. Resetting the ramp signal forces comparator 62 high to set latch 77 and force QB2 low. Thus the high from comparator 80 has no affect on latch 77 and QB1 and QB2 are low to enable transistor 32 to be prepared to couple energy from winding 12 to output 38 upon the next energy transfer. Subsequently, at a time T3 primary drive signal 24 disables transistor 23 causing the energy accumulated in winding 12 to be transferred into secondary windings 13, 14, and 15. The energy transfer forms positive voltages on windings 13, 14, and 15 and forces node 30 high. It generally is desirable to utilize this energy transfer for regulating the secondary voltage. Since transistor 32 was enabled prior to the energy transfer, the energy received on winding 15 is coupled through transistor 32 without having to wait for enabling transistor 32 and without the associated energy loss due to waiting for transistor 32 to be enabled, thereby improving the efficiency provided by the operation of controller 45. The energy transfer forces the sync signal on the output of comparator 80 low which is rapidly fed around transistor 81 to release the set input of latch 69. Since comparator 62 is high, latch 69 remains set with QB1 low. The high to low transition from comparator 80 has no effect on latch 77 since comparator 62 is high and holds the set input high. Thus, QB1 and QB2 are both low and transistor 32 remains enabled to transfer the energy from primary winding 12 through winding 15 to output 38. The low from comparator 80 also disables transistor 81 thereby initiating another ramp signal. The ramp signal and the feedback loop, including error amplifier 61, comparator 62, transistor 32, and resistors 34 and 35, are used to regulate the value of the secondary voltage. Error amplifier 61 receives the feedback signal from node 36. As the ramp signal increases to the value of the output of error amplifier 61 at a time T4, the output of comparator 62 is forced low which resets latch 69 forcing QB1 high to disable transistor 32. The low from comparator 62 has no effect on latch 77 which remains reset. As long as the secondary voltage remains between the first value and the second value, the cycle continues. The operation of controller 45 is synchronized to drive signal 24 by the operation of comparator 80. When signal 24 is active, comparator 80 detects the negative voltage on terminal 30 forcing the sync signal high to set latch 69 and enable transistor 32 and to reset the ramp signal. When signal 24 is inactive, comparator 80 detects the positive voltage on terminal 30 forcing comparator 80 low to disable transistor 81 and initiate a ramp signal and to allow regulation of the secondary voltage with the feedback loop as described.

If the value of the secondary voltage increases to or beyond the second value, such as illustrated at a time T5, it is desirable to stop transferring energy to output 38 and allow the secondary voltage to decrease back to the desired value. In such a case, the error signal on the output of amplifier 61 decreases below the value of the clamp voltage established by diode 82 and forces the output of comparator 62 low. Since latch 69 is a set dominant latch, the high to low transition on the output of comparator 62 at time T5 has no effect on latch 69 and QB1 remains low. The next negative transition on the output of comparator 80 resets latch 77 forcing QB2 high to disable transistor 32. The output of PWM comparator 62 remains low which has no effect on latches 69 and 77. Thus, transistor 32 remains disabled while the secondary voltage is no less than the second value. Those skilled in the art realize that the word while also includes some initial delay between the secondary voltage increasing to the second value and controller 45 disabling transistor 32.

In order to facilitate this operation, an inverting input of amplifier 61 is coupled to receive the feedback signal from input 51, a non-inverting input of amplifier 61 is connected to an output of reference 55, and the output of amplifier 61 is connected to a non-inverting input of comparator 62. An inverting input of comparator 62 is commonly connected to node 58 and a collector of transistor 81. An emitter of transistor 81 is connected to a cathode of diode 82 which has an anode coupled to return 47. An output of comparator 62 is commonly connected to a first input of gate 67, an input of inverter 66, and the set input of latch 77. An output of inverter 66 is connected to a second input of gate 67 which has an output connected to the reset input of latch 69. A set input of latch 69 is commonly connected to the output of comparator 80, an input of inverter 74, and a first input of gate 75. An output of inverter 74 is connected to a second input of gate 75 which has an output connected to the reset input of latch 77. The Q bar output of latch 77 is connected to a first input of gate 71 and a Q bar output of latch 69 is connected to a second input of gate 71 which has an output connected to output 52. An inverting input of comparator 80 is coupled to receive the input signal on input 49 of controller 45. A non-inverting input of comparator 80 is connected to return 47 and an output of comparator 80 is connected to a base of transistor 81. Node 58 is connected to a first terminal of current source 56, to a cathode of diode 57, and to terminal 50. A second terminal of current source 56 is coupled to receive power from input 46 of controller 45. Reference 55 is connected between input 46 and return 47 to receive power.

Figure 3:
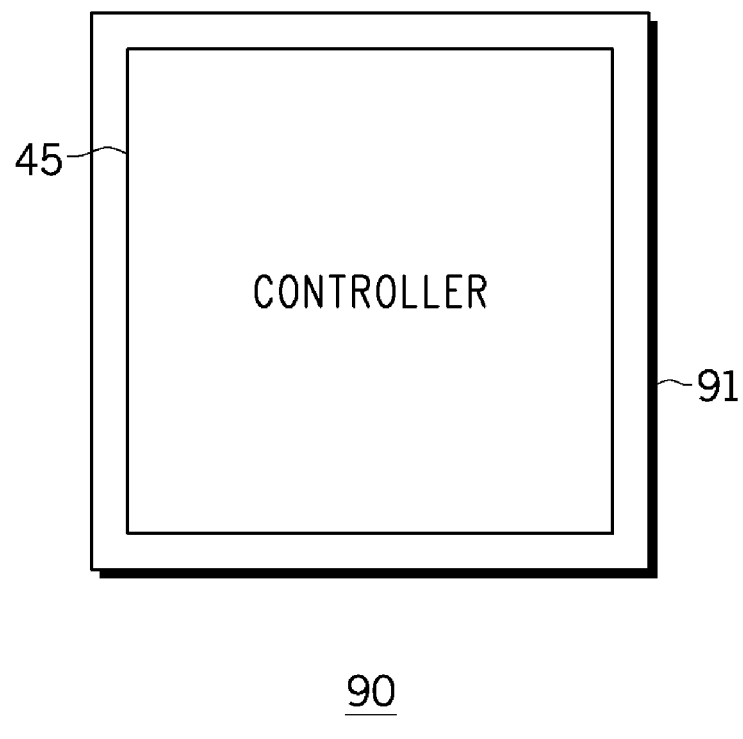
FIG. 3 illustrates an enlarged plan view of a semiconductor device that includes the secondary side power supply controller of FIG. 1 in accordance with the present invention.

FIG. 3 schematically illustrates an enlarged plan view of a portion of an embodiment of a semiconductor device 90 that is formed on a semiconductor die 91. Controller 45 is formed on die 91. Die 91 may also include other circuits that are not shown in FIG. 3 for simplicity of the drawing. Controller 45 and device 90 are formed on die 91 by semiconductor manufacturing techniques that are well known to those skilled in the art.

In view of all of the above, it is evident that a novel device and method is disclosed. Included, among other features, is forming a secondary side controller to provide substantially one hundred per cent duty cycle at least after the secondary voltage is less than a first value in order to rapidly increase the value of the secondary voltage. Forming the controller to feed the sync signal forward to by-pass the ramp capacitor reduces the delay time between the sync signal and enabling the secondary side power switch and improves the maximum operating frequency of the controller.

While the invention is described with specific preferred embodiments, it is evident that many alternatives and variations will be apparent to those skilled in the semiconductor arts. Although controller 45 is illustrated as having only voltage mode control, controller 45 may also include current mode control or may use only current mode control instead of voltage mode control. The word "connected" is used throughout for clarity of the description, however, it is intended to have the same meaning as the word "coupled". Accordingly, "connected" should be interpreted as including either a direct connection or an indirect connection.

The invention claimed is:

1. A secondary side power supply controller for regulating a secondary voltage of a secondary winding of a power supply comprising:
   a synchronizing circuit configured to receive an input signal representative of a primary side switching drive signal used to control a power switch of a primary side of the power supply and responsively provide a sync signal having an active state representative of the primary side switching drive signal;
   a secondary side switching control section configured to receive a feedback signal that is representative of the secondary voltage and receive the sync signal and responsively form a switching control signal operable to control a secondary side power switch for regulating the secondary voltage, the secondary side power switch coupled in series with the secondary winding; and
   control logic configured to receive the sync signal and the switching control signal and responsively form a switching drive signal operable to control the secondary side power switch wherein the control logic is configured to enable the secondary side power switch independently of a state of the primary side switching drive signal at least after the secondary voltage is less than a first value.

2. The secondary side power supply controller of claim 1 wherein the control logic is also configured to disable the secondary side power switch independently of the primary side switching drive signal at least after the secondary voltage is greater than a second value, and configured to operate the secondary side power switch responsively to the feedback signal at least after the secondary voltage is between the first value and the second value.

3. The secondary side power supply controller of claim 2 wherein the control logic also configured to regulate the secondary voltage substantially synchronously with the primary side switching drive signal at least after the secondary voltage is between the first value and the second value.

4. The secondary side power supply controller of claim 3 wherein the control logic also configured to regulate the secondary voltage substantially synchronously with the primary side switching drive signal at least after the secondary voltage is between the first value and the second value includes the control logic configured to form a an active state of the switching control signal substantially synchronously with the primary side switching drive signal.

5. The secondary side power supply controller of claim 1 wherein the control logic includes a first latch having a set input coupled to receive the sync signal from the synchronizing circuit and a first edge detector coupled to receive the switching control signal and responsively reset the first latch responsively to a negative transition of the switching control signal when the sync signal is disabled.

6. The secondary side power supply controller of claim 5 wherein the control logic includes a second latch having a set input coupled to receive the switching control signal and a second edge detector coupled to receive the sync signal from the synchronizing circuit and responsively reset the second latch responsively to a negative transition of the sync signal when the switching control signal is disabled.

7. The secondary side power supply controller of claim 1 further including the control logic configured to enable the secondary side power switch with a substantially one hundred per cent duty cycle at least after the secondary voltage is less than the first value.

8. The secondary side power supply controller of claim 7 wherein the control logic overrides the sync signal at least after the secondary voltage is less than the first value.

9. A method of forming a secondary side controller of a power supply system comprising:
   forming the secondary side controller to enable a secondary side power switch independently of a state of a primary side power switch at least after a secondary voltage of a secondary winding of the power supply system is no greater than a first value.

10. The method of claim 9 wherein forming the secondary side controller to enable the secondary side power switch independently of the state of the primary side power switch includes configuring the secondary side controller to enable the secondary side power switch with substantially one hundred percent duty cycle.

11. The method of claim 9 wherein forming the secondary side controller to enable the secondary side power switch independently of the state of the primary side power switch includes configuring the secondary side controller to form a sync signal that is representative of a primary drive control signal used to control the primary side power switch and to override the sync signal responsively to the secondary voltage being no greater than the first value.

12. The method of claim 11 further including configuring the secondary side controller to enable secondary side power switch responsively to the sync signal responsively to the secondary voltage being greater than the first value.

13. The method of claim 9 further including configuring the secondary side controller to enable the secondary side power switch substantially synchronously with the primary side power switch responsively to the secondary voltage being greater than the first value.

14. The method of claim 9 further including disabling the secondary side power switch independently of the state of the primary side power switch responsively to the secondary voltage being greater than a second value.

15. The method of claim 14 further including configuring the secondary side controller to enable the secondary side power switch substantially synchronously with the primary side power switch and to disable the secondary side power switch responsively to a value of the secondary voltage that is between the first value and the second value.

16. The method of claim 15 wherein configuring the secondary side controller to enable the secondary side power switch substantially synchronously with the primary side power switch includes coupling an output of a synchronizing circuit to enable the secondary side power switch without a delay from a capacitor used to generate a ramp signal used to control an inactive state of the secondary side power switch.

17. A secondary side power supply controller for regulating a secondary voltage of a secondary winding of a power supply comprising:
    a primary side switching control section having a ramp generator, an error amplifier and a PWM comparator;
    a secondary side synchronizing circuit configured to receive a signal from the secondary winding and responsively form a sync signal that is representative of a primary side switching drive signal used to control a primary winding of the power supply; and
    a secondary side control section configured to form a switching drive signal operable to control a secondary side power switch, the secondary side control section configured to form an active state of the switching drive signal independently of a state of the sync signal responsively to the secondary voltage being no greater than a first value.

18. The secondary side power supply controller of claim 17 wherein the secondary side power supply controller is configured to form the active state of the switching drive signal with a substantially one hundred percent duty cycle.

19. The secondary side power supply controller of claim 17 further including the secondary side power supply controller configured to form the active state of the switching drive signal substantially synchronously with the primary side switching drive signal at least after the secondary voltage is greater than the first value.

20. The secondary side power supply controller of claim 19 wherein the sync signal is coupled to form the active state of the switching drive signal without a capacitive delay from a capacitor used by the ramp generator.

* * * * *